Jan. 8, 1935.  A. SUGDEN  1,987,135
VALVE
Filed July 24, 1933
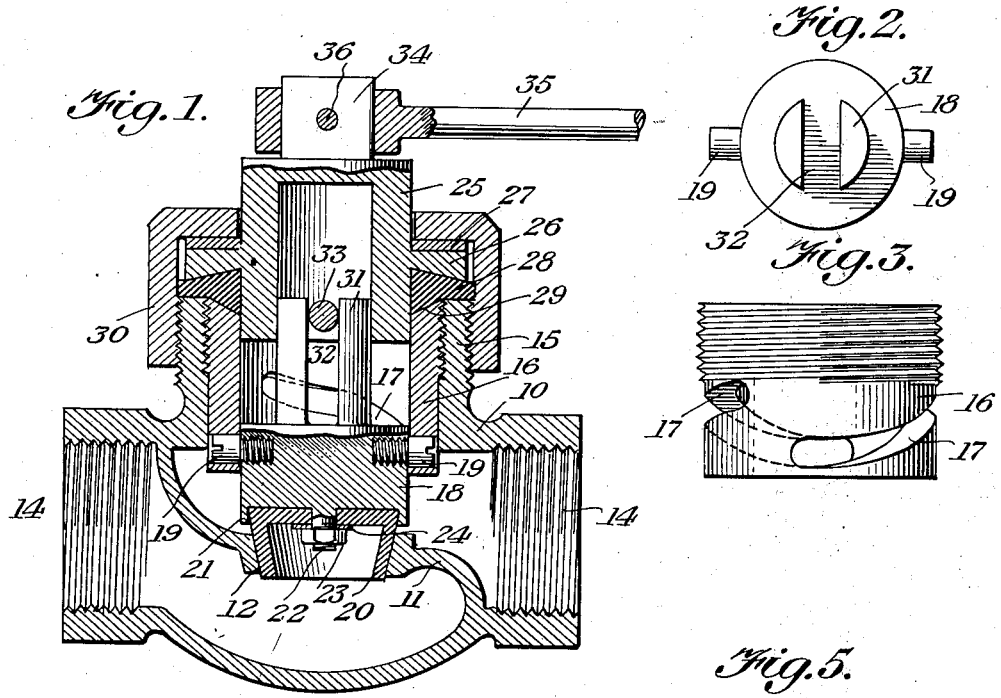
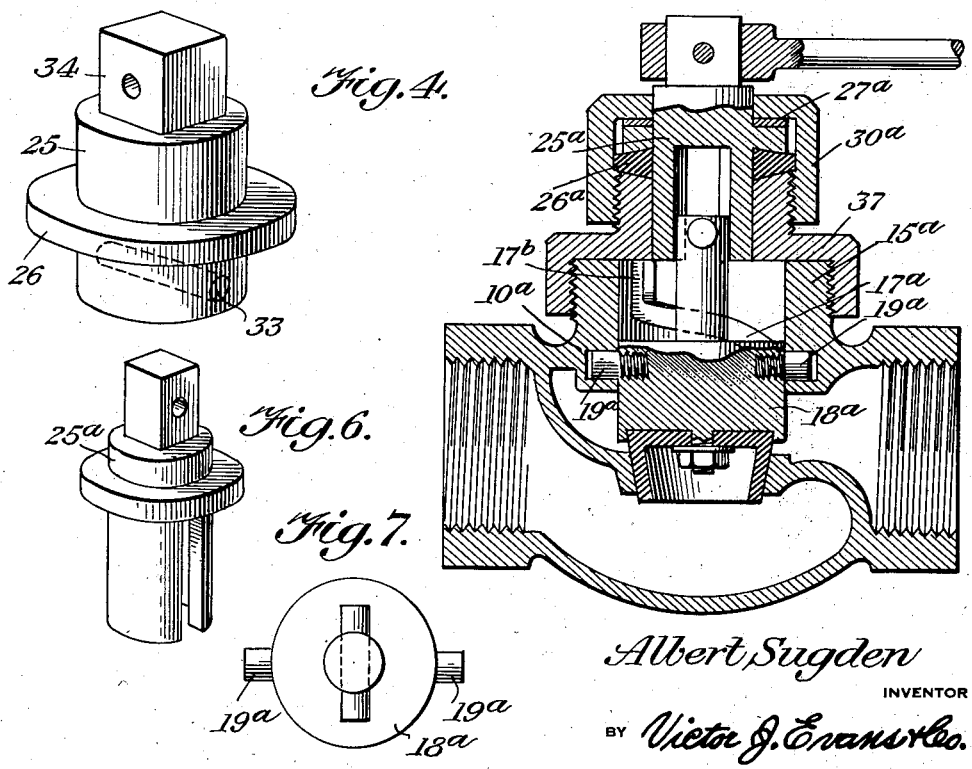
Albert Sugden
INVENTOR
BY Victor J. Evans & Co.
ATTORNEYS Patented Jan. 8, 1935

1,987,135

UNITED STATES PATENT OFFICE 1,987,135

VALVE

Albert Sugden, London, Ontario, Canada

Application July 24, 1933, Serial No. 682,017

1 Claim. (Cl. 251—48)

The object of the invention is to provide an improvement in valves particularly of the globe valve form in which increasing pressure will tend to apply the valve more firmly to its seat, so that where the pressure increases the tendency will be to tighten the seating of the valve rather than to permit leakage; to provide a valve of the globe valve order in which the full opening and closing movements may be effected by a comparatively small degree of movement of the actuating means; to provide a valve in which the parts may be readily assembled or disassembled for repair or replacement of the parts; and generally to provide a valve which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claim.

In the drawing:

Figure 1 is a central vertical sectional view of a valve constructed in accordance with the invention.

Figure 2 is a top plan view of the valve plug.

Figure 3 is an elevational view of the removable cam ring.

Figure 4 is a perspective view of the valve plug actuating head.

Figure 5 is a view similar to Figure 1 but showing a modified form of the invention.

Figure 6 is a perspective view of the actuating head for the valve plug shown in Figure 5.

Figure 7 is a top plan view of the valve plug of the structure shown in Figure 5.

The case or shell 10 in which the parts of the valve are mounted is of the general form of the conventional globe valve, being interiorly formed with a web 11 centrally provided, as at 12, with a port by means of which communication is effected between the opposite sides of the case or shell as defined by the web. The shell is internally threaded as at 14 for connection with discharge and supply pipes. The shell, opposite the web is formed with a ring portion 15 both exteriorly and interiorly threaded, the interior threads being for the reception of the cam ring 16 which on diametrically opposite sides is provided with the spirally arranged slots 17 which extend clear through the wall of the cam ring. The cam ring is bored to permit sliding movement of the valve plug 18 therein, the latter being provided with screw studs 19 arranged on diametrically opposite sides, the heads of the screw studs being disposed in the slots 17. Thus if angular or turning movement be imparted to the plug 18, it will, by reason of the cam slots, be moved axially toward and away from the web 11 and will either seat the valve cone 20 in the port 12 to close the latter or withdraw it from the port. The valve port 12 is circular with its bounding wall arranged at an inclination and the valve cone 20 is similarly formed, except that it is of pliable material, preferably fiber, and is hollowed out, so that it is really a thin-walled structure.

The plug 18 on its under face is recessed to leave a peripheral flange 21 which together with the adjacent bottom wall of the plug defines a seat for the cone, the latter being connected with the plug by reason of an integral pendent stud 22 on its lower face passing through an opening in the body or web portion of the cone 20 and receiving a nut 23 which, bearing against a washer 24, retains the cone in its seat on the plug. When the cone is seated, increase of pressure below the web 11 tends to force the peripheral wall of the cone against the wall of the port 12, by reason of the fluid, entering the hollow cone and exerting lateral pressure on the side wall thereof.

To impart angular or turning movement to the valve plug, a hollow actuating head 25 is provided, this being of an exterior diameter to permit its entering the cam ring 16 at the upper end. This actuating head is formed with a peripheral flange 26, the under face of which is formed at a downward inclination but the upper face of which is horizontal. The flange 26 bears, on its upper face, against a gasket 27 which surrounds the actuating head, and on its under face bears against packing 28, the packing entering a channel provided by the bounding wall of the actuating member 25 and the upper inwardly beveled edge 29 of the cam ring.

A gland ring 30 threaded to the ring portion 15 on the exterior of the latter, surrounds the actuating head 25 and its top portion overlaps the flange 26 and the gasket 27 disposed thereupon. Thus the actuating head, by reason of its peripheral flange and the associated gland ring, secure the packing in place and prevent leakage around the actuating head but without preventing angular or turning movement of the latter.

Since the actuating head may move angularly but not axially and since it is designed to actuate the valve plug, there must be relative axial movement between the two but not relative angular movement and to accomplish this the valve plug is formed with a stem portion 31 which enters the bore of the actuating head but which is formed with a diametrical slot 32 which extends throughout its length. A diametrical pin 33 spanning the bore of the actuating head, enters the slot and thus provides for imparting angular or turning movement to the plug from a corresponding movement imparted to the actuating head, the cam slots 17, by reason of their operative connections with the plug, imparting the necessary axial movement to the latter to seat or unseat the valve cone 20.

The actuating member 25 is formed with a wrench seat 34 with which a wrench or handle 35 may be engaged and the latter, if desired, secured to the actuating member by the insertion of a pin 36 passed through the loop of the handle and diametrically through the wrench seat.

The construction of the modified form shown in Figure 5 is identical with the construction shown in Figure 1 with the exception that the former omits the cam ring and has the cam slots 17ª formed in the ring portion 15ª of the case or shell 10ª. In order that the plug 18ª may be inserted in the ring portion 15ª, so that its cam studs 19ª will enter the slots 17ª, the slots 17ª terminate in upwardly extending extensions 17ᵇ opening on the upper edge of the ring portion 15ª. The ring portion 15ª is only exteriorly threaded, so that the supplemental ring member 37 may be attached, this ring member acting as a guide for the valve plug actuating head 25ª, which is identical with the valve plug actuating head 25, except in size.

The upper edge of the supplemental ring member 37 is beveled inwardly toward the bore and it is externally threaded at this point to receive the gland ring 30ª and permit the retention of the packing 26ª and the gasket 27ª.

In operation, the construction of Figure 5 functions in the same manner as the structure of Figure 1.

The invention having been described, what is claimed as new and useful is:

A valve comprising a case formed interiorly with a web portion having a port therein, a plug having a port closing member carried thereby, the plug having a cross-sectionally circular stem portion slotted diametrically throughout its length, a hollow actuating head telescoping the stem portion and formed at its lower end with a diametrically arranged pin traversing the slot in said stem portion to permit relative axial movement of the plug and actuating member but preclude relative angular or turning movement, a cam ring within the case in surrounding relation to the hollow actuating member and the plug, and diametrically arranged studs on the periphery of the plug, the cam ring being formed with diametrically opposite spiral slots of an angular extent just in excess of ninety degrees and the studs on the plug traversing said slots, the actuating member being formed with a peripheral flange, a gasket in surrounding relation to the actuating member and disposed between the flange and the upper edges of the cam ring and case, and a gland ring threadingly engaged with the case and in overlapping relation to the flange of the actuating member.

ALBERT SUGDEN.